(12) United States Patent
Du

(10) Patent No.: US 10,868,905 B2
(45) Date of Patent: Dec. 15, 2020

(54) TEXT MESSAGE PLAYING METHOD, TERMINAL AND COMPUTER-READABLE STORAGE MEDIUM

(71) Applicant: ZTE Corporation, Guangdong (CN)

(72) Inventor: Zhaoxi Du, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/649,610

(22) PCT Filed: Aug. 15, 2018

(86) PCT No.: PCT/CN2018/100627
§ 371 (c)(1),
(2) Date: Mar. 20, 2020

(87) PCT Pub. No.: WO2019/056893
PCT Pub. Date: Mar. 28, 2019

(65) Prior Publication Data
US 2020/0274963 A1 Aug. 27, 2020

(30) Foreign Application Priority Data
Sep. 21, 2017 (CN) .......................... 2017 1 0858722

(51) Int. Cl.
*H04M 1/725* (2006.01)
*H04W 4/14* (2009.01)

(52) U.S. Cl.
CPC ... *H04M 1/72552* (2013.01); *H04M 1/72563* (2013.01); *H04M 1/72594* (2013.01); *H04M 1/72597* (2013.01); *H04W 4/14* (2013.01)

(58) Field of Classification Search
CPC ......... H04W 4/14; H04W 24/02; H04W 4/16; H04W 4/12; G06F 3/0482; G06F 3/04883;
(Continued)

(56) References Cited

U.S. PATENT DOCUMENTS 5,003,577 A * 3/1991 Ertz .................... H04M 3/5307
370/428
9,591,117 B1 * 3/2017 Toren .................... G06F 3/0482
(Continued)

FOREIGN PATENT DOCUMENTS

| CN | 101175272 A | 5/2008 |
|---|---|---|
| CN | 102098628 A | 6/2011 |

(Continued)

OTHER PUBLICATIONS

International Search Report in International Patent Application No. PCT/CN2018/100627 dated Nov. 1, 2018, 5 pages.

*Primary Examiner* — Daniel Lai
(74) *Attorney, Agent, or Firm* — Knobbe, Martens, Olson & Bear, LLP

(57) ABSTRACT

Provided is a text message playing method. When a text message is received, an incoming call interface is displayed, where the incoming call interface includes a control function region which is used for controlling whether to play the text message. A first operation instruction to the control function region is received, and the text message is played in a preset playing mode, where the first operation instruction is used for instructing to play the text message. In this way, a humanized and diversified text message playing style is gained, and user experience is improved through a simple and convenient operation. Further provided are a terminal and a computer-readable storage medium.

11 Claims, 5 Drawing Sheets

(58) Field of Classification Search
CPC ....... G10L 13/043; G10L 15/26; G10L 13/00; H04M 2201/60; H04M 2203/2011; H04M 2203/651; H04M 1/72552; H04M 3/53333; H04M 1/72583; H04M 3/42034; H04M 3/42059; H04M 3/53358; H04M 1/72594; H04M 1/72563; H04M 1/72597
See application file for complete search history.

(56) References Cited

U.S. PATENT DOCUMENTS

| | | | |
|---|---|---|---|
| 2010/0263015 A1* | 10/2010 | Pandey | H04N 21/43615 725/153 |
| 2011/0300833 A1* | 12/2011 | Shaw | H04M 11/10 455/413 |
| 2014/0195252 A1* | 7/2014 | Gruber | G10L 15/22 704/275 |
| 2015/0040012 A1* | 2/2015 | Faaborg | G06F 3/04817 715/728 |
| 2017/0126871 A1* | 5/2017 | Babayev | H04M 1/72594 |

FOREIGN PATENT DOCUMENTS

| | | |
|---|---|---|
| CN | 103051785 A | 4/2013 |
| CN | 103533519 A | 1/2014 |
| CN | 103581853 A | 2/2014 |
| CN | 104486473 A | 4/2015 |
| CN | 108206887 A | 6/2018 |

* cited by examiner

TEXT MESSAGE PLAYING METHOD, TERMINAL AND COMPUTER-READABLE STORAGE MEDIUM

CROSS REFERENCE TO RELATED APPLICATIONS

This is a U.S. National Stage Application, filed under 35 U.S.C. 371, of International Patent Application No. PCT/CN2018/100627, filed on Aug. 15, 2018, which claims priority to Chinese patent application No. 201710858722.4 filed on Sep. 21, 2017, contents of both of which are incorporated herein by reference in their entireties.

TECHNICAL FIELD

The present disclosure relates to the field of communications and, in particular, to a text message playing method, a terminal and a computer-readable storage medium.

BACKGROUND

With the continuous development of communications and electronic technologies, a terminal with a communication function has increasingly wider applications in people's lives. The terminal has more and more functions, such as answering calls, making calls, sending and receiving text messages, and surfing the Internet. Compared with a call function of a mobile phone, a text message function of the mobile phone has the advantages of convenience, privacy and economy. Even if a mobile phone of the other user is turned off, a text message of the mobile phone will be delivered as usual. As a preferred information dissemination means, the text message has constructed a new way of interpersonal communications, and thus the mobile phone has become an indispensable communication tool in people's daily lives.

In the related art, after the mobile phone receives the text message, the mobile phone will ring the text message to prompt the user to check the text message in time; after hearing a ring tone of the text message, the user enters a text message reading mode of the mobile phone through a touch screen operation to read content of the received text message. However, an existing manner for acquiring the received text message will cause inconvenience to the user. For example, for an elderly or illiterate person who is unfamiliar with operations of the mobile phone, the content of the text messages cannot be learned. Although some mobile phones may convert the content of the text message into a voice to be played by an operation of the user, this operation is more tedious and will still cause inconvenience to a user who is unfamiliar with an operation process of the mobile phone.

SUMMARY

In order to solve the existing technical problem, embodiments of the present disclosure provide a text message playing method, a terminal and a computer-readable storage medium, which can prompt the receipt of a text message through an incoming call interface, play the text message in a preset playing mode to gain a humanized and diversified play style, and improve user experience through a simple and convenient operation.

To achieve the preceding object, solutions in the embodiments of the present disclosure are implemented as follows.

An embodiment of the present disclosure provides a text message playing method, including steps described below.

When a text message is received, an incoming call interface is displayed, where the incoming call interface includes a control function region which is used for controlling whether to play the text message.

A first operation instruction to the control function region is received, and the text message is played in a preset playing mode, where the first operation instruction is used for instructing to play the text message.

Optionally, before the incoming call interface is displayed, the method further includes steps described below.

A communication identifier for sending the text message is acquired, a pre-stored communication identifier identical to the communication identifier of the text message is determined from among pre-stored communication identifiers, and a preset playing mode corresponding the pre-stored communication identifier is taken as a playing mode corresponding to the communication identifier of the text message, where each pre-stored communication identifier among the pre-stored communication identifiers is preset with a preset playing mode corresponding to the each pre-stored communication identifier.

Optionally, the step of playing the text message in the preset playing mode includes a step described below.

The text message is played in the playing mode corresponding to the communication identifier of the text message according to the first operation instruction.

Optionally, the method further includes a step described below.

When the text message is played in the playing mode corresponding to the communication identifier of the text message according to the first operation instruction, the text message is displayed on the incoming call interface according to a preset font.

Optionally, after the text message is played in the playing mode corresponding to the communication identifier of the text message according to the first operation instruction, the method further includes steps described below.

It is prompted by voice that the text message has been played, and it is detected within preset time whether voice information is inputted.

In response to receiving the inputted voice information within the preset time, the voice information is converted into text reply information.

The text reply information is sent to a terminal corresponding to the communication identifier of the text message.

Optionally, the incoming call interface further includes a recording function option, and the method further includes steps described below.

After the text message has been played, a second operation instruction to the recording function option is received, a record of a voice signal is acquired in response to the second operation instruction, the voice signal is converted into text reply information, and the text reply information is sent to a terminal corresponding to the communication identifier of the text message.

Optionally, the method further includes a step described below.

In response to the communication identifier of the text message being different from any one of the pre-stored communication identifiers, the text message is displayed by a text on the incoming call interface.

Alternatively, in response to the communication identifier of the text message being different from any one of the pre-stored communication identifiers, a preset default playing mode is determined as the playing mode corresponding to the communication identifier of the text message.

Optionally, the method further includes a step described below.

In response to receiving a preset control voice when the text message is played in the playing mode corresponding to the communication identifier of the text message according to the first operation instruction, a playing volume of the text message is adjusted.

An embodiment of the present disclosure further provides a terminal, including a display unit, a receiving unit and a playing unit.

The display unit is configured to: when a text message is received, display an incoming call interface, where the incoming call interface includes a control function region which is used for controlling whether to play the text message.

The receiving unit is configured to receive a first operation instruction to the control function region.

The playing unit is configured to play the text message in a preset playing mode, where the first operation instruction is used for instructing to play the text message.

Optionally, the terminal further includes an acquisition unit and a determining unit.

The acquisition unit is configured to acquire a communication identifier for sending the text message.

The determining unit is configured to determine, from among pre-stored communication identifiers, a pre-stored communication identifier identical to the communication identifier of the text message and take a preset playing mode corresponding the pre-stored communication identifier as a playing mode corresponding to the communication identifier of the text message, where each pre-stored communication identifier among the pre-stored communication identifiers is preset with a preset playing mode corresponding to the each pre-stored communication identifier.

Optionally, the playing unit is configured to play the text message in the playing mode corresponding to the communication identifier of the text message according to the first operation instruction.

Optionally, the display unit is further configured to: when the text message is played in the playing mode corresponding to the communication identifier of the text message according to the first operation instruction, display the text message on the incoming call interface according to a preset font.

Optionally, the terminal further includes a detection unit, a conversion unit and a sending unit.

The playing unit is configured to prompt by voice that the text message has been played.

The detection unit is configured to detect within preset time whether voice information is inputted.

The conversion unit is configured to: in response to determining that the inputted voice information is received within the preset time, convert the voice information into text reply information.

The sending unit is configured to send the text reply information to a terminal corresponding to the communication identifier of the text message.

Optionally, the incoming call interface further includes a recording function option, and the terminal further includes a recording unit, a conversion unit and a sending unit.

The receiving unit is further configured to: after the text message has been played, receive a second operation instruction to the recording function option.

The recording unit is configured to acquire a record of a voice signal in response to the second operation instruction.

The conversion unit is configured to convert the voice signal into text reply information.

The sending unit is configured to send the text reply information to a terminal corresponding to the communication identifier of the text message.

Optionally, the display unit is configured to: in response to the communication identifier of the text message being different from any one of the pre-stored communication identifiers, display the text message by a text on the incoming call interface.

The determining unit is configured to: in response to the communication identifier of the text message being different from any one of the pre-stored communication identifiers, determine a preset default playing mode as the playing mode corresponding to the communication identifier of the text message.

Optionally, the terminal further includes an adjustment unit.

The receiving unit is further configured to receive a preset control voice when the text message is played in the playing mode corresponding to the communication identifier of the text message according to the first operation instruction.

The adjustment unit is configured to adjust a playing volume of the text message.

An embodiment of the present disclosure further provides a terminal, including a processor and a memory, where the processor is configured to perform a text message playing program stored in the memory to implement steps of the method described above.

An embodiment of the present disclosure further provides a computer-readable storage medium, which is configured to store one or more programs executable by one or more processors to implement steps of the method described above.

The embodiments of the present disclosure provide a text message playing method, a terminal and a computer-readable storage medium. When the text message is received, the incoming call interface is displayed, where the incoming call interface includes the control function region which is used for controlling whether to play the text message. The first operation instruction to the control function region is received, and the text message is played in the preset playing mode, where the first operation instruction is used for instructing to play the text message. The text message playing method, the terminal and the computer-readable storage medium provided by the embodiments of the present disclosure can prompt the receipt of a text message in the form of the incoming call interface and play the text message in the preset playing mode after the text message is received to gain the humanized and diversified play style, and improve the user experience through the simple and convenient operation.

BRIEF DESCRIPTION OF DRAWINGS

In the drawings (which are not necessarily drawn to scale), similar reference numerals in the drawings may denote similar components in different diagrams. The similar reference numerals with different letter suffixes may denote different examples of the similar components. The drawings generally illustrate various embodiments discussed herein by way of examples rather than limitations.

DETAILED DESCRIPTION

Technical solutions in embodiments of the present disclosure will be described below clearly and completely in conjunction with the drawings in the embodiments of the present disclosure.

Figure 1:
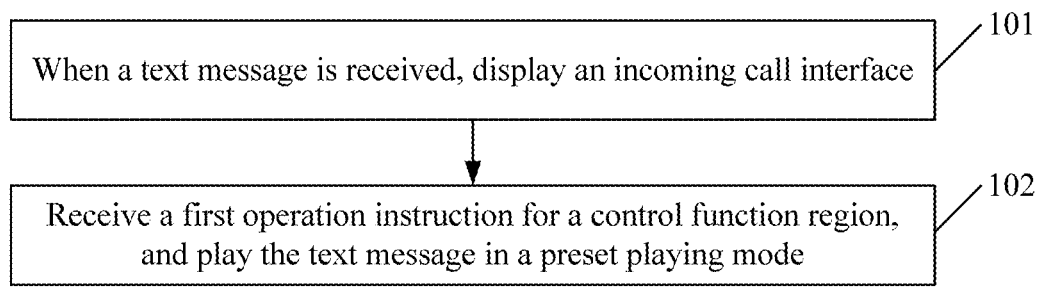
FIG. 1 is a flowchart one of a text message playing method according to an embodiment of the present disclosure.

An embodiment of the present disclosure provides a text message playing method. As shown in FIG. 1, the method may include steps described below.

In step 101, when a text message is received, an incoming call interface is displayed.

The incoming call interface includes a control function region which is used for controlling whether to play the text message. For example, "answer" and "hang-up" options on the incoming call interface are the control function region.

The text message playing method provided by the embodiment of the present disclosure may be executed by a terminal, and specifically may be a text message application carried by the terminal itself or may be a third-party application installed on the terminal.

The incoming call interface may include a name, a phone number, an image identifier, an answer option, a hang-up option, etc., which is not limited in the embodiment of the present disclosure.

Figure 2:
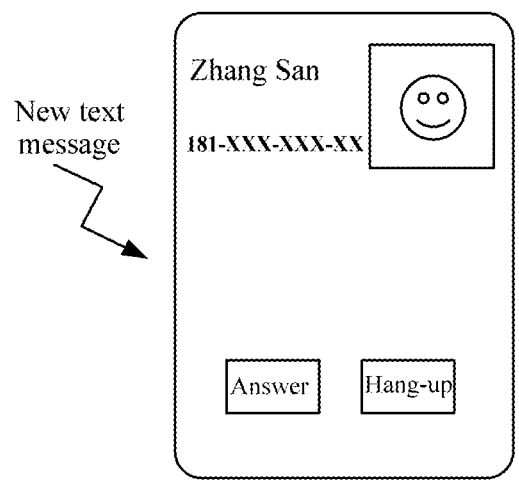
FIG. 2 is a schematic diagram one illustrating an incoming call interface of a terminal according to an embodiment of the present disclosure.

For example, as shown in a diagram of an example of the incoming call interface in FIG. 2, the "answer" and "hang up" options are on the incoming call interface, the name is "Zhang San", the phone number is "181-XXX-XXX-XX", and the image identifier of the user, Zhang San, is displayed on the right of the name and the phone number.

In one or more embodiments, the terminal may prompt, in a form of an incoming call, the user that the text message is received. A prompt that the text message is received may be a ring, a vibration, or the ring and vibration. The prompt may also be other manner for reminding the user of the reception of the text message in the form of the incoming call interface. The prompt is not limited in the embodiment of the present disclosure.

Furthermore, before the incoming call interface is displayed, the method further includes steps described below.

A communication identifier of the text message for sending the text message is acquired, a playing mode corresponding to the communication identifier of the text message is determined according to pre-stored communication identifiers.

The communication identifier of the text message may be a phone number, that is, the terminal acquires the phone number that sends the text message.

The terminal determines the playing mode corresponding to the communication identifier of the text message according to the pre-stored communication identifiers specifically in implementation manners described below.

In a possible implementation manner, the terminal determines, from among the pre-stored communication identifiers, a pre-stored communication identifier identical to the communication identifier of the text message and takes a preset playing mode corresponding the pre-stored communication identifier as the playing mode corresponding to the communication identifier of the text message. Herein, each pre-stored communication identifier among the pre-stored communication identifiers is preset with a preset playing mode corresponding to the each pre-stored communication identifier.

In a possible implementation manner, when the communication identifier of the text message is different from any one of the pre-stored communication identifiers, the text message is displayed by a text on the incoming call interface.

In a possible implementation manner, when the communication identifier of the text message is different from any one of the pre-stored communication identifiers, a preset default playing mode is determined as the playing mode corresponding to the communication identifier of the text message.

Figure 4:
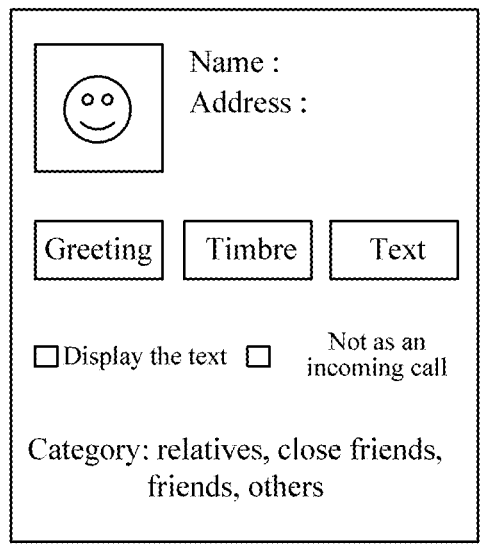
FIG. 4 is a schematic diagram of a setting example of a playing mode according to an embodiment of the present disclosure.

Here, the pre-stored communication identifiers may be understood as the phone numbers stored in an address book of the terminal. The user sets each number in the address book with its corresponding preset playing mode in advance. Specific setting content may include a name, a home address, an image identifier of the user, a greeting, an ending word, a timbre, a font for displaying the text, whether to display the text synchronously, and a user category. For example, as shown in a diagram of a setting example in FIG. 4, the user may set the playing mode used for playing the text message on this interface.

The playing mode corresponding to the communication identifier of the text message may include one or more of a preset timbre, a preset starting voice or a preset ending voice.

In step 102, a first operation instruction executed on the control function region is received, and the text message is displayed in the preset playing mode.

The first operation instruction is used for instructing to play the text message.

In one or more embodiments, after the incoming call interface is displayed, it may be determined whether the first operation instruction applied to the control function region of the incoming call interface has been received from the user within a first preset time period, and if the first operation instruction to the control function region has been received within the first preset time, the text message is played in the preset playing mode according to the first operation instruction.

The first preset time may be 10 seconds, 1 minute, or other time values, which is not limited in the embodiments of the present disclosure.

Here, the first operation instruction is used for instructing to play the text message. The first operation instruction may be a touch operation instruction or a button operation instruction, and may also be other operation instruction that can control the answer and hang-up options on the incoming call interface, which is not limited in the embodiments of the present disclosure.

In a possible implementation manner, the step of playing the text message in the preset playing mode includes a step described below.

The text message is played in the playing mode corresponding to the communication identifier of the text message according to the first operation instruction.

In a possible implementation manner, the playing mode includes the preset timbre; and the step of playing the text message in the playing mode corresponding to the communication identifier of the text message according to the first operation instruction may include that the terminal plays the text message according to the preset timbre.

In a possible implementation manner, the playing mode includes the preset timbre, the preset starting voice and the preset ending voice; and the step of playing the text message in the playing mode corresponding to the communication identifier of the text message according to the first operation instruction includes a step described below.

The terminal plays the preset starting voice, plays the text message according to the preset timbre after the preset starting voice is played, and plays the preset ending voice after the text message is played.

For example, the starting voice is the greeting, for example, "hello mom!"; the ending voice is the ending word, for example, "bye, let's talk next time!"; the preset timbre may be a dialect, for example, a Sichuan accent, a northeastern accent, etc.

Furthermore, the method may further includes: displaying the text message on the incoming call interface according to a preset font when the text message is played in the playing mode corresponding to the communication identifier of the text message according to the first operation instruction.

Specifically, the method provided by the embodiment of the present disclosure may display the text message by the text on the incoming call interface during the text message is played by a voice, that is, when the text message is played in the playing mode corresponding to the communication identifier of the text message according to the first operation instruction, the text message is displayed on the incoming call interface according to the preset font.

Optionally, if the operation instruction to the incoming call interface is not received within the first preset time, the terminal may store the text message.

Optionally, the method provided by the embodiment of the present disclosure may control a volume for playing the text message by a voice, which may specifically include: in response to receiving a preset control voice when the text message is played in the playing mode corresponding to the communication identifier of the text message according to the operation instruction, adjusting a playing volume of the text message.

Specifically, the preset control voice is an instruction voice that is used for controlling the playing volume of the text message, and the instruction voice is recorded and stored by the user in advance. When the text message is played by voice, if the user utters the preset control voice, the terminal may turn up or down the volume for playing the text message.

The preset control voice may be "hey, hey", "higher", "lower", or other voices. The user may set the voice according to personal habits of the user, and setting content of the preset control voice is not limited in the embodiments of the present disclosure.

Exemplarily, in the process of playing the text message by voice, if the terminal identifies that the user utters the voice "hey, hey", the terminal determines that the user is likely to be unable to hear the voice clearly and actively turns up the volume so that the user can hear the played text message clearly.

Furthermore, after the text message is played in the playing mode corresponding to the communication identifier of the text message according to the first operation instruction, the method further includes steps described below.

It is prompted, by voice, that the text message has been played, and it is detected within preset time whether voice information is inputted.

If the inputted voice information is received within the preset time, the voice information is converted into text reply information.

The text reply information is sent to a terminal corresponding to the communication identifier of the text message.

Specifically, the method provided by the embodiment of the present disclosure may replay the text message after the text message is played by voice, which specifically includes steps described below. The terminal prompts the user by voice that the text message has been played, and detects within the preset time whether the voice information is inputted. If the terminal receives the inputted voice information within the preset time, the terminal convers the voice information into the text reply information, and sends the text reply information to the terminal corresponding to the communication identifier of the text message.

Optionally, the incoming call interface further includes a recording function option, and the method further includes steps described below.

After the text message has been played, a second operation instruction to the recording function option is received, a record of a voice signal is acquired in response to the second operation instruction, the voice signal is converted into the text reply information, and the text reply information is sent to the terminal corresponding to the communication identifier of the text message.

The text message playing method provided by the embodiment of the present disclosure can remind the receipt of the text message via the incoming call interface, play the content of the text message in the playing mode, smartly select the timbre according to marks of different communication identifiers, for example, a male voice, a female voice, etc. to gain the humanized and diversified playing style, and improve user experience through a simple and convenient operation.

Figure 3:
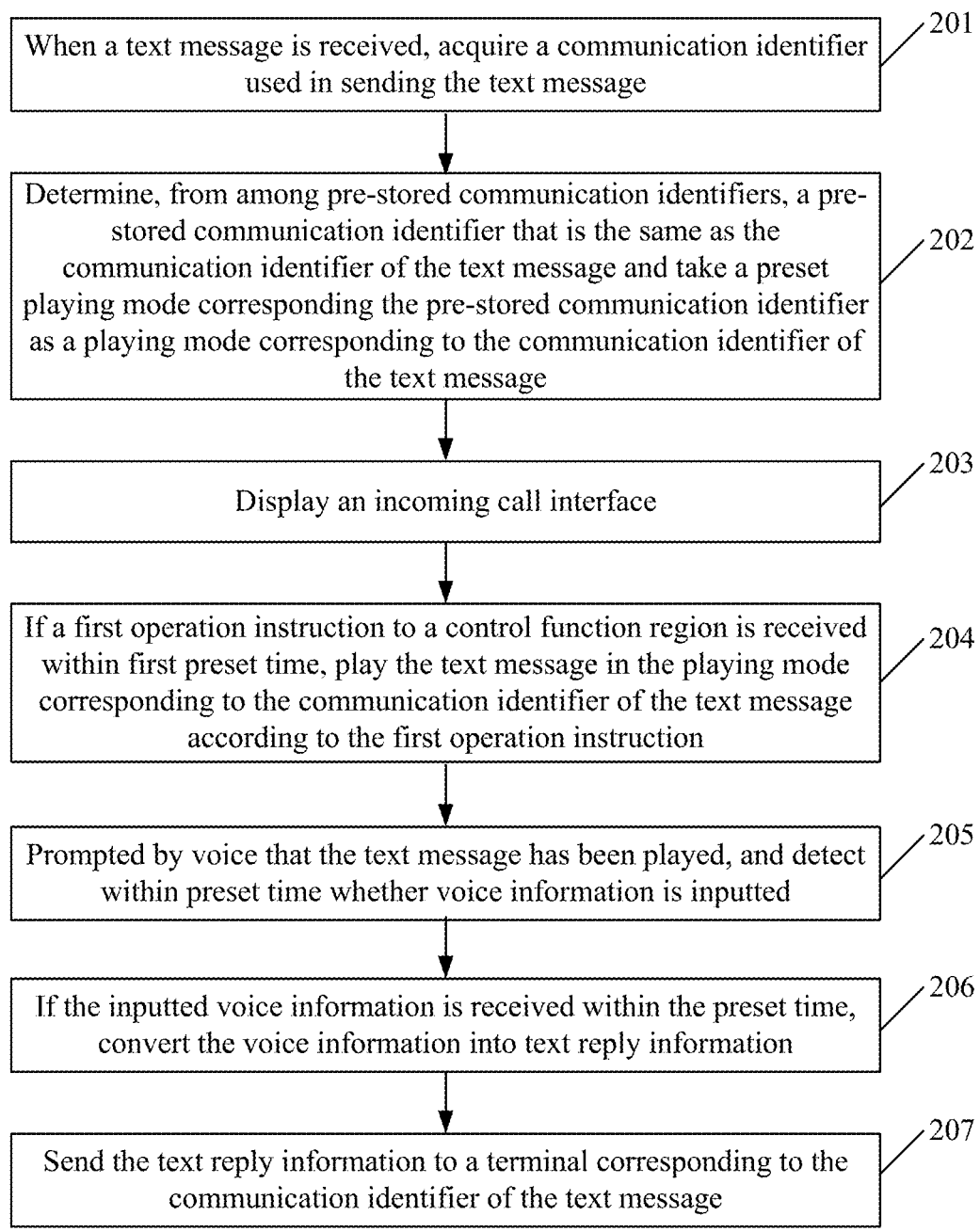
FIG. 3 is a flowchart two of a text message playing method according to an embodiment of the present disclosure.

An embodiment of the present disclosure provides a text message playing method. As shown in FIG. 3, the method may include steps described below.

In step 201, when a text message is received, a communication identifier of the sending of the text message is acquired.

The text message playing method provided by the embodiment of the present disclosure may be executed by a terminal. Specifically the execution object of the text message playing method may be a text message application carried by the terminal itself or a third-party application installed on the terminal.

The communication identifier of the text message may be a phone number, that is, the terminal acquires the phone number for sending the text message.

In step 202, a pre-stored communication identifier identical to the communication identifier of the text message is determined from among pre-stored communication identifiers, and a preset playing mode corresponding the pre-stored communication identifier is taken as a playing mode corresponding to the communication identifier of the text message.

Each pre-stored communication identifier among the pre-stored communication identifiers is preset with a preset playing mode corresponding to the each pre-stored communication identifier.

Here, the pre-stored communication identifiers may be understood as phone numbers stored in an address book of the terminal. A user presets a corresponding preset playing mode for each number in the address book. Specific setting content may include a name, a home address, an image identifier of the user, a greeting, an ending word, a timbre, a font for displaying a text, whether to display the text synchronously, and a user category. For example, as shown in a diagram of a setting example in FIG. 4, the user may set the playing mode used for playing the text message on this interface.

The greeting and the ending word may be a voice recorded by the user or may be a downloaded synthetic voice, which is not limited in the embodiments of the present disclosure. The image identifier of the user may be a photo, selected from an album, or acquired from the address book, which is not limited in the embodiments of the present disclosure. A size of the font for displaying the text may be set, and a type of the display font may also be set.

Here, the greeting is a starting voice, for example, "hello mom!"; the ending word is an ending voice, for example, "bye, let's talk next time!"; the timbre may be a dialect, for example, a Sichuan accent, a northeastern accent, etc.

Exemplarily, the user may group people in the address book. Only text messages from families or close friends may be displayed as incoming calls, and a text message from an ordinary telephone number is not displayed as the incoming call.

Optionally, in response to determining that the communication identifier of the text message is different from any one of the pre-stored communication identifiers, a preset default playing mode is determined as the playing mode corresponding to the communication identifier of the text message, or the terminal displays the text message by the text on the incoming call interface.

Here, the preset default playing mode may be a playing mode preset by the user for a strange number that is not in the address book.

Specifically, when the phone number that sends the text message is not in the address book, that is, the phone number that sends the text message is a strange number, the text message may be played in the preset playing mode corresponding to the strange number, and the text message may also be displayed directly. A specific selection may be set by the user according to personal preferences, which is not limited in the embodiments of the present disclosure.

In step 203, the incoming call interface is displayed.

Here, the incoming call interface includes a control function region which is used for controlling whether to play the text message.

The incoming call interface may include the name, the phone number, the image identifier, an answer option, a hang-up option, etc., which is not limited in the embodiments of the present disclosure. For example, the incoming call interface is shown in FIG. 2.

Specifically, the user is reminded via the incoming call interface that the text message is received. A prompt for the reception of the text message may be a ring, a vibration, or the ring and the vibration, and may also be other manner for reminding the user that the text message is received, which is not limited in the embodiment of the present disclosure.

In step 204, if a first operation instruction on the control function region is received within first preset time, the text message is played in the playing mode corresponding to the communication identifier of the text message according to the first operation instruction.

The first preset time may be 10 seconds, 1 minute, or other time values, which is not limited in the embodiments of the present disclosure.

Here, the first operation instruction is used for instructing to play the text message. The first operation instruction may be a touch operation instruction or a button operation instruction, and may also be another operation instruction that can control the incoming call interface, which is not limited in the embodiments of the present disclosure.

Optionally, the method may further implement a function of displaying the text message synchronously, which may specifically include: displaying the text message on the incoming call interface in a preset font when the text message is played in the playing mode corresponding to the communication identifier of the text message according to the first operation instruction.

Optionally, the method provided by the embodiment of the present disclosure may control the volume for playing the text message by voice, which may specifically include: in response to receiving a preset control voice when the text message is played in the playing mode corresponding to the communication identifier of the text message according to the operation instruction, adjusting a playing volume of the text message.

Specifically, the preset control voice is an instruction voice that is used for controlling the playing volume of the text message, and the instruction voice is recorded and stored by the user in advance. When the text message is played by voice, if the user utters the preset control voice, the terminal may turn up or down the volume for playing the text message, that is, the terminal may smartly change the playing volume according to a usage environment and a practical usage manner of the user.

The preset control voice may be "hey, hey", "higher", "lower", or other voices. The user may set the voice according to personal habits of the user, and setting content of the preset control voice is not limited in the embodiments of the present disclosure.

Exemplarily, in the process of playing the text message by voice, if the terminal identifies that the user utters the voice "hey, hey", the terminal determines that the user is likely to be unable to hear the voice clearly and actively turns up the volume so that the user can hear the played text message clearly.

After the text message has been played, the method may further implement a function of replying to the text message, which specifically includes steps described below.

In step 205, it is prompted by voice that the text message has been played, and it is detected within preset time whether voice information is inputted.

The preset time may be 5 seconds, 20 seconds, or other time values, which is not limited in the embodiments of the present disclosure.

Figure 5:
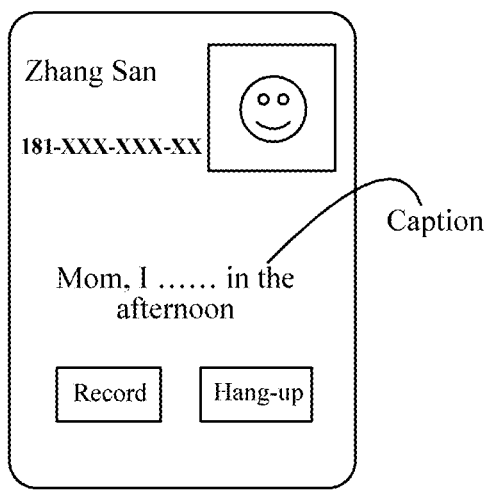
FIG. 5 is a schematic diagram two illustrating an incoming call interface of a terminal according to an embodiment of the present disclosure.

Here, the voice information may be a voice of the user for replying to the text message. As shown in FIG. 5, the user expresses reply content by voice, and the terminal converts the voice into the text.

In step 206, if the inputted voice information is received within the preset time, the voice information is converted into text reply information.

In step 207, the text reply information is sent to a terminal corresponding to the communication identifier of the text message.

Specifically, a voice reply is allowed during or after the content of the text message is played, and a voice recognition function is used for converting the voice into the text by a voice recognition technology. On an appropriate occasion, the content of the text message is replied to the sender. In this way, user experience is improved, and the text message communication problem of many illiterate or elderly people is solved.

The communication identifier of the text message may be the phone number, that is, the terminal sends the text reply information to a mobile phone terminal of the phone number that sends the text message.

Furthermore, the incoming call interface further includes a recording function option, and the method further includes steps described below.

After the text message has been played, a second operation instruction applied to the recording function option is received, a record of a voice signal is acquired in response to the second operation instruction, the voice signal is converted into the text reply information, and the text reply information is sent to the terminal corresponding to the communication identifier of the text message.

The text message playing method provided by the embodiment of the present disclosure can remind, through the incoming call interface, the reception of the text message after the text message is received, automatically search for the playing mode corresponding to the communication identifier for sending the text message, play the content of the text message in the playing mode, smartly select the timbre according to marks of different communication identifiers, for example, a male voice, a female voice, etc. and replay to the text message by the voice to gain the humanized and diversified playing style, and improve the user experience through a simple and convenient operation.

Figure 6:
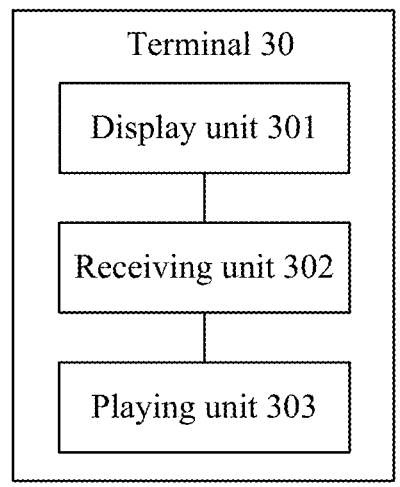
FIG. 6 is a structural diagram one of a terminal according to an embodiment of the present disclosure.

An embodiment of the present disclosure provides a terminal 30. As shown in FIG. 6, the terminal 30 includes a display unit 301, a receiving unit 302 and a playing unit 303.

The display unit 301 is configured to: when a text message is received, display an incoming call interface, where the incoming call interface includes a control function region which is used for controlling whether to play the text message.

The receiving unit 302 is configured to receive a first operation instruction applied to the control function region.

The playing unit 303 is configured to play the text message in a preset playing mode, where the first operation instruction is used for instructing to play the text message.

Figure 7:
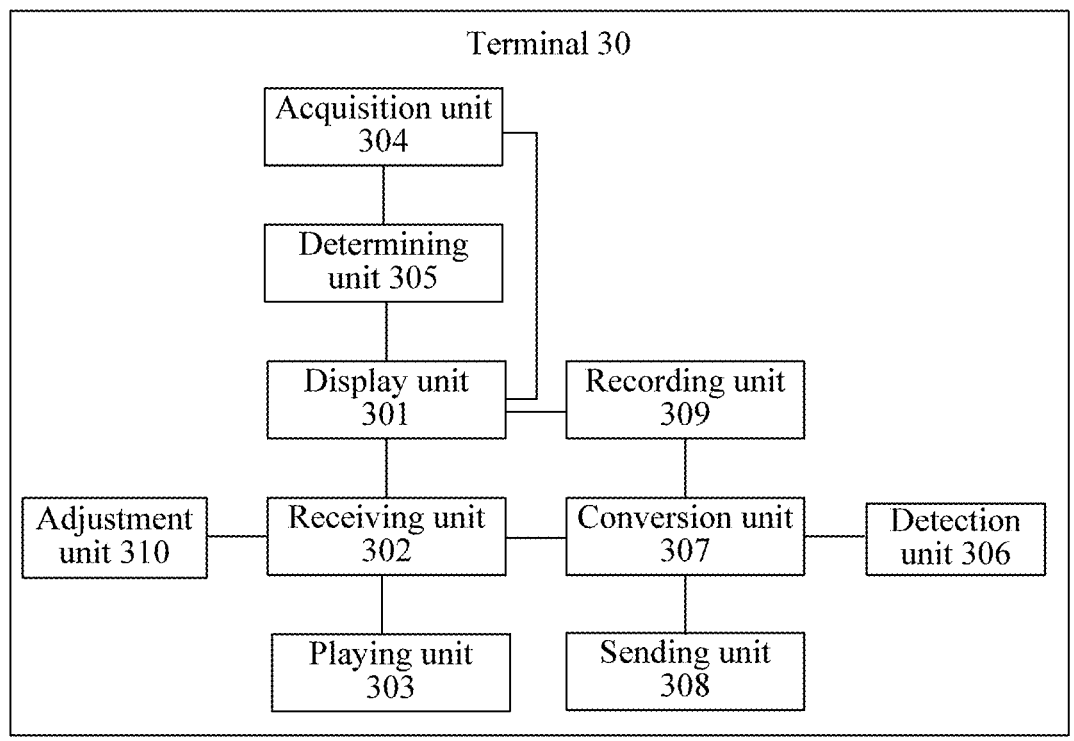
FIG. 7 is a structural diagram two of a terminal according to an embodiment of the present disclosure.

Furthermore, as shown in FIG. 7, the terminal 30 further includes an acquisition unit 304 and a determining unit 305.

The acquisition unit 304 is configured to acquire a communication identifier for sending the text message.

The determining unit 305 is configured to determine, from among pre-stored communication identifiers, a pre-stored communication identifier identical to the communication identifier of the text message and take a preset playing mode corresponding the pre-stored communication identifier as a playing mode corresponding to the communication identifier of the text message, where each pre-stored communication identifier among the pre-stored communication identifiers is preset with a preset playing mode corresponding to the each pre-stored communication identifier.

Furthermore, the playing unit 303 is configured to play the text message in the playing mode corresponding to the communication identifier of the text message according to the first operation instruction.

Furthermore, the display unit 301 is further configured to: when the text message is played in the playing mode corresponding to the communication identifier of the text message according to the first operation instruction, display the text message on the incoming call interface according to a preset font.

Furthermore, as shown in FIG. 7, the terminal 30 further includes a detection unit 306, a conversion unit 307 and a sending unit 308.

The playing unit 303 is configured to prompt by voice that the text message has been played.

The detection unit 306 is configured to detect within preset time whether voice information is inputted.

The conversion unit 307 is configured to: in response to determining that the inputted voice information is received within the preset time, convert the voice information into text reply information.

The sending unit 308 is configured to send the text reply information to a terminal corresponding to the communication identifier of the text message.

Furthermore, as shown in FIG. 7, the incoming call interface further includes a recording function option, and the terminal 30 further includes a recording unit 309, a conversion unit 307 and a sending unit 308.

The receiving unit 302 is further configured to: after the text message has been played, receive a second operation instruction applied to the recording function option.

The recording unit 309 is configured to acquire a record of a voice signal in response to the second operation instruction.

The conversion unit 307 is configured to convert the voice signal into the text reply information.

The sending unit 308 is configured to send the text reply information to the terminal corresponding to the communication identifier of the text message.

Furthermore, the display unit 301 is configured to: in response to determining that the communication identifier of the text message is different from any one of the pre-stored communication identifiers, display the text message by a text on the incoming call interface.

Alternatively, the determining unit 305 is configured to: in response to determining that the communication identifier of the text message is different from any one of the pre-stored communication identifiers, determine a preset default playing mode as the playing mode corresponding to the communication identifier of the text message.

Furthermore, as shown in FIG. 7, the terminal further includes a receiving unit 302 and an adjustment unit 310.

The receiving unit 302 is further configured to receive a preset control voice when the text message is played in the playing mode corresponding to the communication identifier of the text message according to the first operation instruction.

The adjustment unit 310 is configured to adjust a playing volume of the text message.

It is to be noted that when the terminal provided by the above-mentioned embodiment plays the text message, an exemplary description is provided merely by the division of program modules described above, and in practical applications, the processing described above may be distributed and performed by different program modules according to needs, that is, an internal structure of an apparatus is divided into different program modules to perform all or part of the processing described above. In addition, the terminal provided by the embodiment described above has the same concept as the method embodiment of the text message playing method, and for a specific implementation process, reference is made to the method embodiment and repetition is not made herein.

The terminal provided by the embodiment of the present disclosure can remind, through in the incoming call interface, the reception of the text message after the text message is received, automatically search for the playing mode corresponding to the communication identifier for sending the text message, play the content of the text message in the playing mode, smartly select a timbre according to marks of different communication identifiers, for example, a male voice, a female voice, etc. and replay to the text message by the voice to gain the humanized and diversified playing style, and improve user experience through a simple and convenient operation.

Figure 8:
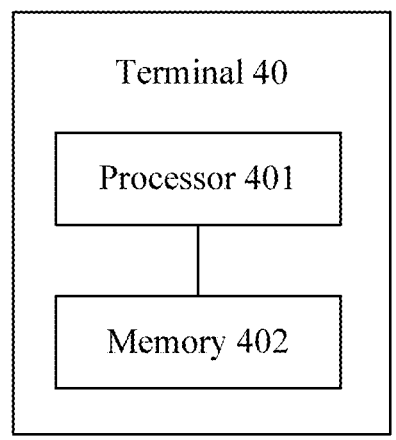
FIG. 8 is a structural diagram three of a terminal according to an embodiment of the present disclosure.

An embodiment of the present disclosure provides a terminal 40. As shown in FIG. 8, the terminal may include a processor 401 and a memory 402, where the processor is configured to perform a text message playing program stored in the memory to implement steps described below.

When a text message is received, an incoming call interface is displayed, where the incoming call interface includes a control function region which is used for controlling whether to play the text message.

A first operation instruction applied to the control function region is received, and the text message is played in a preset playing mode, where the first operation instruction is used for instructing to play the text message.

Furthermore, before the incoming call interface is displayed, the processor 401 is further configured to perform the text message playing program to implement steps described below.

A communication identifier used in sending the text message is acquired, and a preset playing mode corresponding to a pre-stored communication identifier identical to the communication identifier of the text message is determined, form among pre-stored communication identifiers, as a playing mode corresponding to the communication identifier of the text message, where each pre-stored communication identifier among the pre-stored communication identifiers is preset with a preset playing mode corresponding to the each pre-stored communication identifier.

Furthermore, the processor 401 is further configured to perform the text message playing program to implement a step described below.

The text message is played in the playing mode corresponding to the communication identifier of the text message according to the first operation instruction.

Furthermore, the processor 401 is further configured to perform the text message playing program to implement a step described below.

When the text message is played in the playing mode corresponding to the communication identifier of the text message according to the first operation instruction, the text message is displayed on the incoming call interface according to a preset font.

Furthermore, after the text message is played in the playing mode corresponding to the communication identifier of the text message according to the first operation instruction, the processor 401 is further configured to perform the text message playing program to implement steps described below.

It is prompted by voice that the text message has been played, and it is detected within preset time whether voice information is inputted.

If the inputted voice information is received within the preset time, the voice information is converted into text reply information.

The text reply information is sent to a terminal corresponding to the communication identifier of the text message.

Furthermore, the incoming call interface further includes a recording function option, and the processor 401 is further configured to perform the text message playing program to implement steps described below.

After the text message has been played, a second operation instruction applied to the recording function option is received, a record of a voice signal is acquired in response to the second operation instruction, the voice signal is converted into the text reply information, and the text reply information is sent to the terminal corresponding to the communication identifier of the text message.

Furthermore, the processor 401 is further configured to perform the text message playing program to implement a step described below.

In response to determining that the communication identifier of the text message is different from any one of the pre-stored communication identifiers, the text message is displayed by a text on the incoming call interface.

Alternatively, in response to determining that the communication identifier of the text message is different from any one of the pre-stored communication identifiers, a preset default playing mode is determined as the playing mode corresponding to the communication identifier of the text message.

Furthermore, the processor 401 is further configured to perform the text message playing program to implement a step described below.

In response to receiving a preset control voice when the text message is played in the playing mode corresponding to the communication identifier of the text message according to the first operation instruction, a playing volume of the text message is adjusted.

Here, the memory 402 may be a volatile memory or a non-volatile memory, or may include both the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic disk memory or a magnetic tape memory. The volatile memory may be a random access memory (RAM), which serves as an external cache. By way of an exemplary description rather than a limited description, many forms of RAMs may be used, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM), and a direct Rambus random access memory (DRRAM). The memory 402 described in the embodiment of the present disclosure is intended to include, but is not limited to, these memories and any other suitable type of memory.

The processor 401 may be an integrated circuit chip with a signal processing capability. In the implementation process, various steps of the method described above may be performed by an integrated logic circuit of hardware in the processor 401 or an instruction in the form of software. The processor 401 described above may be a general-purpose processor, a digital signal processor (DSP), or another programmable logic device, another discrete gate or transistor logic device, another discrete hardware component or the like. The processor 401 may implement or perform various methods, steps and logic block diagrams disclosed in the embodiments of the present disclosure. The general-purpose processor may be a microprocessor or any conventional processor. The steps of the method disclosed by the embodiments of the present disclosure may be directly implemented by a hardware decoding processor, or may be implemented by a combination of hardware and software modules in the decoding processor. The software module may be located in a storage medium 402 in the memory 402. The processor 401 reads information in the memory 402 and implements the steps of the method described above in conjunction with hardware of the processor 401.

Specifically, for the understanding of the terminal provided by the embodiment of the present disclosure, reference may be made to the description of the embodiment of the text message playing method described above, and repetition is not made herein.

The terminal provided by the embodiment of the present disclosure can remind the received text message in the form of the incoming call interface after the text message is received, automatically search for the playing mode corresponding to the communication identifier for sending the text message, play the content of the text message in the playing mode, smartly select a timbre according to marks of different communication identifiers, for example, a male voice, a female voice, etc. and replay to the text message by the voice to gain the humanized and diversified playing style, and improve user experience through a simple and convenient operation.

An embodiment of the present disclosure further provides a computer-readable storage medium, which is configured to store one or more programs executable by one or more processors to implement steps of the text message playing method described above.

Here, the computer-readable storage medium may be an FRAM, a ROM, a PROM, an EPROM, an EEPROM, a flash memory, a magnetic surface memory, an optical disk, a CD-ROM or other memories, or may be various devices including one or any combination of the memories described above, such as a mobile phone and a tablet device.

It should be understood by those skilled in the art that the embodiments of the present disclosure may be provided as methods, systems or computer program products. Therefore, the present disclosure may adopt a hardware embodiment, a software embodiment, or a combination of hardware and software embodiments. In addition, the present disclosure may adopt the form of a computer program product implemented on one or more computer-usable storage media (including, but not limited to, a disk memory, an optical memory, etc.) that include computer-usable program codes.

The present disclosure is described with reference to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions can also be stored in a computer-readable memory which can direct the computer or another programmable data processing device to operate in a particular manner so that the instructions stored in the computer-readable memory produce a manufactured product including an instruction means. The instruction means implements the functions specified in one or more flows in the flowcharts and/or one or more blocks in the block diagrams.

These computer program instructions can also be loaded onto the computer or another programmable data processing device so that a series of operation steps are performed on the computer or another programmable device to produce the processing implemented by the computer. Therefore, the instructions executed on the computer or another programmable device provide steps for implementing the functions specified in one or more flows in the flowcharts and/or one or more blocks in the block diagrams.

The above are merely preferred embodiments of the present disclosure and are not intended to limit the scope of the present disclosure.

INDUSTRIAL APPLICABILITY

The present disclosure is applicable to the field of communications and is used for reminding, via an incoming call interface, receiving of a text message and playing the content of the text message in the preset playing mode after the text message is received, so as to gain the humanized and diversified playing style, and the present disclosure improves the user experience through the simple and convenient operation.

What is claimed is:

1. A text message playing method, comprising:
   in response to receiving a text message, displaying an incoming call interface, wherein the incoming call interface comprises a control function region which is used for controlling whether to play the text message; and
   receiving a first operation instruction to the control function region, and playing the text message in a preset playing mode, wherein the first operation instruction is used for instructing to play the text message;
   before displaying the incoming call interface, further comprising:
   acquiring a communication identifier of the text message for sending the text message, and determining a preset playing mode corresponding to a pre-stored communication identifier, among pre-stored communication identifiers, which is identical to the communication identifier of the text message, wherein each pre-stored communication identifier among the pre-stored communication identifiers is preset with a preset playing mode corresponding to the each pre-stored communication identifier;
   wherein playing the text message in the preset playing mode comprises:
   playing the text message in the playing mode corresponding to the communication identifier of the text message according to the first operation instruction;

after playing the text message in the playing mode corresponding to the communication identifier of the text message according to the first operation instruction, further comprising:
prompting by voice that the text message has been played, and detecting within preset time whether voice information is inputted;
in response to receiving the inputted voice information within the preset time, converting the voice information into text reply information; and
sending the text reply information to a terminal corresponding to the communication identifier of the text message.

2. The method of claim 1, further comprising:
when playing the text message in the playing mode corresponding to the communication identifier of the text message according to the first operation instruction, displaying the text message on the incoming call interface according to a preset font.

3. The method of claim 1, wherein the incoming call interface further comprises a recording function option, and the method further comprises:
after the text message has been played, receiving a second operation instruction to the recording function option, acquiring a record of a voice signal in response to the second operation instruction, converting the voice signal into text reply information, and sending the text reply information to a terminal corresponding to the communication identifier of the text message.

4. The method of claim 1, further comprising:
in response to the communication identifier of the text message being different from any one of the pre-stored communication identifiers, displaying the text message by a text on the incoming call interface; or
in response to the communication identifier of the text message being different from any one of the pre-stored communication identifiers, determining a preset default playing mode as the playing mode corresponding to the communication identifier of the text message.

5. The method of claim 1, further comprising:
in response to receiving a preset control voice when playing the text message in the playing mode corresponding to the communication identifier of the text message according to the operation instruction, adjusting a playing volume of the text message.

6. A terminal, comprising a processor and a memory, wherein the processor is configured to perform a text message playing method,
wherein the text message playing method comprises:
in response to receiving a text message, displaying an incoming call interface, wherein the incoming call interface comprises a control function region which is used for controlling whether to play the text message; and
receiving a first operation instruction to the control function region, and playing the text message in a preset playing mode, wherein the first operation instruction is used for instructing to play the text message;
before displaying the incoming call interface, the method further comprises:
acquiring a communication identifier of the text message for sending the text message, and determining a preset playing mode corresponding to a pre-stored communication identifier, among pre-stored communication identifiers, which is identical to the communication identifier of the text message as a playing mode corresponding to the communication identifier of the text message, wherein each pre-stored communication identifier among the pre-stored communication identifiers is preset with a preset playing mode corresponding to the each pre-stored communication identifier;
wherein playing the text message in the preset playing mode comprises:
playing the text message in the playing mode corresponding to the communication identifier of the text message according to the first operation instruction;
after playing the text message in the playing mode corresponding to the communication identifier of the text message according to the first operation instruction, the method further comprises:
prompting by voice that the text message has been played, and detecting within preset time whether voice information is inputted;
in response to receiving the inputted voice information within the preset time, converting the voice information into text reply information; and
sending the text reply information to a terminal corresponding to the communication identifier of the text message.

7. The terminal of claim 6, wherein the method further comprises: when playing the text message in the playing mode corresponding to the communication identifier of the text message according to the first operation instruction, displaying the text message on the incoming call interface according to a preset font.

8. The terminal of claim 6, wherein the incoming call interface further comprises a recording function option, and the method further comprises:
after the text message has been played, receiving a second operation instruction to the recording function option, acquiring a record of a voice signal in response to the second operation instruction, converting the voice signal into text reply information, and sending the text reply information to a terminal corresponding to the communication identifier of the text message.

9. The terminal of claim 6, wherein the method further comprises:
in response to the communication identifier of the text message being different from any one of the pre-stored communication identifiers, displaying the text message by a text on the incoming call interface; or
in response to the communication identifier of the text message being different from any one of the pre-stored communication identifiers, determining a preset default playing mode as the playing mode corresponding to the communication identifier of the text message.

10. The terminal of claim 6, wherein the method further comprises: in response to receiving a preset control voice when playing the text message in the playing mode corresponding to the communication identifier of the text message according to the operation instruction, adjusting a playing volume of the text message.

11. A non-transitory computer-readable storage medium, which is configured to store one or more programs executable by one or more processors to implement a text message playing method,
wherein the text message playing method comprises:
in response to receiving a text message, displaying an incoming call interface, wherein the incoming call interface comprises a control function region which is used for controlling whether to play the text message; and
receiving a first operation instruction to the control function region, and playing the text message in a preset playing mode, wherein the first operation instruction is used for instructing to play the text message;

before displaying the incoming call interface, the method further comprises:

acquiring a communication identifier of the text message for sending the text message, and determining a preset playing mode corresponding to a pre-stored communication identifier, among pre-stored communication identifiers, which is identical to the communication identifier of the text message as a playing mode corresponding to the communication identifier of the text message, wherein each pre-stored communication identifier among the pre-stored communication identifiers is preset with a preset playing mode corresponding to the each pre-stored communication identifier;

wherein playing the text message in the preset playing mode comprises:

playing the text message in the playing mode corresponding to the communication identifier of the text message according to the first operation instruction;

after playing the text message in the playing mode corresponding to the communication identifier of the text message according to the first operation instruction, the method further comprises:

prompting by voice that the text message has been played, and detecting within preset time whether voice information is inputted;

in response to receiving the inputted voice information within the preset time, converting the voice information into text reply information; and sending the text reply information to a terminal corresponding to the communication identifier of the text message.

* * * * *